United States Patent
Johnson et al.

(10) Patent No.: US 7,283,272 B2
(45) Date of Patent: Oct. 16, 2007

(54) SYSTEM AND METHOD FOR CONTROLLING A REMOTE PRINTER

(75) Inventors: Charles D. Johnson, Boulder, CO (US); Devayani R. Talukdar, Superior, CO (US)

(73) Assignee: InfoPrint Solutions Company, Boulder, CO (US)

( * ) Notice: Subject to any disclaimer, the term of this patent is extended or adjusted under 35 U.S.C. 154(b) by 996 days.

(21) Appl. No.: 10/405,150

(22) Filed: Apr. 1, 2003

(65) Prior Publication Data

US 2004/0196492 A1  Oct. 7, 2004

(51) Int. Cl.
*G06F 15/16* (2006.01)
*H04N 1/00* (2006.01)

(52) U.S. Cl. ............... 358/1.15; 358/1.16; 358/402; 370/392; 370/471; 370/349; 370/389; 709/228; 709/229; 709/205; 709/206; 700/24; 700/28; 700/9

(58) Field of Classification Search ............... 358/1.15, 358/1.16, 402; 709/205, 206, 228, 229, 225, 709/226; 700/28, 24, 9, 100, 102; 715/752; 370/349, 389, 392, 471
See application file for complete search history.

(56) References Cited

U.S. PATENT DOCUMENTS

| | | | |
|---|---|---|---|
| 6,160,631 A | 12/2000 | Okimoto et al. | |
| 6,268,926 B1 | 7/2001 | Okimoto et al. | |
| 6,310,694 B1 | 10/2001 | Okimoto et al. | |
| 6,333,791 B1 | 12/2001 | Okimoto et al. | |
| 6,980,927 B2* | 12/2005 | Tracy et al. | 702/181 |
| 2001/0003827 A1 | 6/2001 | Shimamura | |
| 2001/0005864 A1 | 6/2001 | Mousseau et al. | |
| 2001/0017712 A1 | 8/2001 | Kasatani | |
| 2001/0019425 A1 | 9/2001 | Yamashita | |
| 2001/0040693 A1 | 11/2001 | Saito et al. | |
| 2001/0054115 A1 | 12/2001 | Ferguson et al. | |
| 2002/0002590 A1 | 1/2002 | King et al. | |
| 2002/0143924 A1* | 10/2002 | Iga | 709/223 |
| 2004/0004736 A1* | 1/2004 | Ogura et al. | 358/1.15 |

FOREIGN PATENT DOCUMENTS

| | | |
|---|---|---|
| EP | 1003307 A2 | 5/2000 |
| JP | 10042123 | 2/1998 |
| JP | 11136432 | 5/1999 |
| WO | WO 0148615 A1 | 7/2001 |

* cited by examiner

*Primary Examiner*—Aung S. Moe
*Assistant Examiner*—Scott A. Schlack
(74) *Attorney, Agent, or Firm*—Duft Bornsen & Fishman, LLP (57) ABSTRACT

A printer connected to a network prints documents transmitted as portions of E-mail messages sent to the printer from computer systems through a print server. The printing process is controlled by administrative settings stored within the printer and further by keyword-value pairs recorded in the subject lines of the E-mail messages. The printer preferably also acts as a web page server to client systems connected to the network, with administrative settings being updated through the network following recognition of a password.

23 Claims, 6 Drawing Sheets

FIG. 5

SYSTEM AND METHOD FOR CONTROLLING A REMOTE PRINTER

BACKGROUND OF THE INVENTION

1. Field of the Invention

This invention relates to controlling a printer to print portions of E-mail messages in accordance with settings provided by a user through the header of an E-mail message sent to the printer, and further in accordance with settings provided by a printer administrator, and additionally in accordance with a file format of documents sent to the printer.

2. Summary of the Background Art

A number of E-mail printing systems in the background art use portions of non-printing headers, such as the MIME headers associated with documents to determine how E-mail documents will be printed. A disadvantage of such methods arises from the fact that a new process, unique to the type of printing system, is required for the generation of the E-mail message, in order to generate or modify a non-printing header.

U.S. Pat. Appl. Pub. No. 2002/0143924 describes a method for controlling a printer, with the method being applied to a mail server connected to the printer and a network. The mail server has an address inherent to the printer. In this method, the e-mail received by the mail server is decoded by a mail process unit. When an e-mail message includes a control instruction, a process is executed within the printer according to the control instruction. Such control instructions are executed to turn the power supply of the printer on or off, to provide a report on printer supplies management information, such as the volume of toner remaining in the printer, to provide a report of an operational state check of the printer, to update firmware of the printer with data in a file attached to the e-mail, to otherwise provide a maintenance operation, or to print an attached file. E-mail addressed to the printer includes a mail header and mail text. The printer mail address, a title, and the transmitter mail address are set in the mail header. The printer mail address is the destination address of the e-mail, and the transmitter mail address is the source address of the e-mail. A printer number, a command for performing a control instruction, and a password for security are set in the mail text. Within a printer control unit, a print process unit includes a number of emulators to support emulation processes, such as TIFF, Postscript, HPGL, and bit maps. The print process unit converts a file attached to the e-mail into a bitmap file, which is sent to the printer as a printer file. For example, the command "TIFF" means that the attached file is in the TIFF format.

U.S. Pat. No. 6,160,631 describes a print system capable of exchanging data in the form of electronic mail between computer systems in a plurality thereof using low-cost communication via the Internet. When the printer driver of a personal computer selects a personal computer on another computer system as the destination, the printer driver and the print mail transmission utility create print mail in which a mail header including print information is added to the print data for the contents of the mail, and the print mail is transmitted via the Internet addressed to the personal computer. The print mail reception utility of the personal computer receives the print mail and prints the print mail on a printer based on the print information included in the mail header.

Other examples of the patent literature describe printing systems that are similar to the system of U.S. Pat. No. 6,160,631, except that added features are activated through the use of data within the print header. For example, U.S. Pat. No. 6,268,926 uses an indication of the number of pages in the document to change the format of the documents printed so that the time and paper required to print a long document is reduced to one-fourth their normal values. U.S. Pat. No. 6,310,694 describes a print system of this type including a feature allowing a user transmitting a document for printing to specify parts of the document that are not printed. U.S. Pat. No. 6,333,791 describes such a print system in which the user is asked to specify whether a long document will be printed.

What is needed is an E-mail system in which a port monitor is used to generate E-mail to be printed on a system printer that prints E-mail messages from many systems, including systems sending E-mail messages in plain text, including command words determining conditions of printing, without the benefit of the specialized port monitor.

A process called net distribution has been used within a system having a plurality of terminals to distribute documents among users of the terminals through printers within the system. Usually, Net Distribution is adapted so that a printing job for printing out documents to be distributed is transmitted to the printers, while a distribution message is delivered to the terminal users requesting them to pick up documents at the printer outputs. Several printed patent applications describe methods for controlling the distribution of documents printed from E-mail messages by including information in the E-mail messages.

For example, U.S. Pat. App. Pub. No. 2001/0019425 describes a printing apparatus suitable for net distribution of secret documents, with the printing apparatus having a control section for transmitting a distribution message only to the receiving terminals specified for net distribution. The control section is further adapted to print documents only when the distribution information is included in the printing instructions.

U.S. Pat. App. Pub. No. 2001/0017712 describes E-mail printing apparatus for use by someone not having a printer, with the printing apparatus producing a print out only after the user enters an identifier based on information included in the E-mail.

U.S. Pat. App. Pub. No. 2002/0002590 describes a system and method for routing E-mails based on the recipient's physical address. The system includes an E-mail server that runs an authoritative process by which user login and password information is checked to maintain a secure system.

U.S. Pat. App. Pub. No. 2001/0040693 describes the use of an E-mail control section that transfers received E-mail that cannot be printed to another information terminal device. A facsimile control section instructs a facsimile section to print an error message including sender information and an attached file format.

European Pat. App. No. 1,003,307 describes a system in which the E-mail message may be sent to a user who reads information regarding the purpose of the E-mail message in the body of the message. When the user is satisfied that it is safe to perform the functions requested by the E-mail, the user may execute a file which is attached to the incoming E-mail message to perform the required diagnostic or control functions. In an alternative embodiment, the incoming mail message may contain a code, or may be sent to an address that automatic execution of the desired functions, with a program executing in a computing system parsing the E-mail to determine if the E-mail is for a device attached to the computing system. Such parsing is performed by determining if a predetermined code exists at a predetermined place in the E-mail message. Exemplary positions of such a code may be in the subject line of the E-mail message, may be a special code which appears within the message body, may be a code which appears in the message header, including a user-defined field within the header, or may even be in the message envelope.

SUMMARY OF THE INVENTION

It is an objective of the invention to provide a means for controlling a remote printer with data included in a printable portion of an E-mail message including a document to be printed.

It is another objective of the invention to provide a means for transmitting information as a part of an E-mail message with the information not being changed during transmission of the message through a network.

It is yet another objective of the invention to provide a printing system controlled in response to the wishes of a remote user as indicated by keywords in an E-mail message directed toward the printing system and additionally in response to the wishes of a printer administrator as indicated by administrative settings stored within the printing system.

It is a further objective of the invention to provide an E-mail printer operating within a network without requiring changes to other parts of the network.

In accordance with a first version of the invention, a system for remotely printing a document is provided. The system includes a network, a mail server, a computer, and a printer. The mail server is connected to the network, wherein the mail server receives and stores E-mail messages from the network. The computer transmits an E-mail message including the document to the mail server over the network. The printer receives the E-mail message from the mail server. The printer includes a processor, data storage, and a print engine printing images on paper in response to operation of the processor. The processor is programmed to execute steps of:

parsing a header portion of the E-mail message to determine whether portions of the E-mail message are to be printed according to administrative settings derived from data stored within the data storage and to determine whether portions of the E-mail message are to be printed according to user settings determined from keywords within the header potion of the E-mail message, in response to determining that portions of the E-mail message are to be printed according to the administrative settings, causing the print engine to print the portions of the E-mail message according to the administrative settings, and in response to determining that portions of the E-mail message are to be printed according to the user settings, causing the print engine to print the portions of the E-mail message according to the user settings.

A network is understood to include a local area network (LAN), the Internet, or a combination of the Internet and one or more LANs.

DETAILED DESCRIPTION OF THE INVENTION

Figure 1:
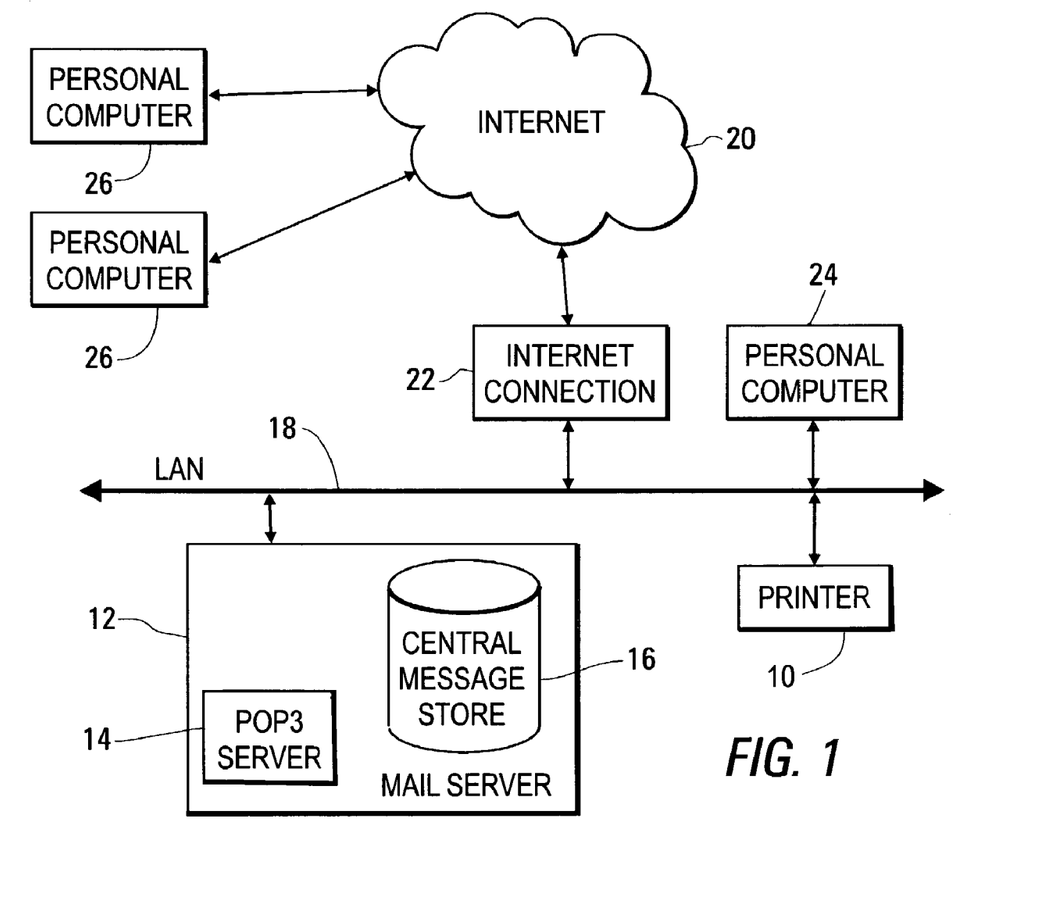
FIG. 1 is a block diagram of a system configured in accordance with the invention, including a network, a mail server, and a printer operating in accordance with the invention.

FIG. 1 is a block diagram of a system configured in accordance with the invention to include a printer 10 operating in accordance with the invention and a mail server 12 that provides a function of a POP3 server 14, sending data to the printer 10 in accordance with the POP3 (Post Office Protocol, version 3) message retrieval protocol. This protocol allows a client, such as the printer 10, to retrieve messages from a central message store 16, called a "post office," on demand. The printer 10 and the mail server 12 are connected through a LAN 18 (local area network). The printer 10 acts as a user on the POP3 server 14, having a user account on the server 14.

In the example of FIG. 1, the LAN 18 is in turn connected to the Internet 20 through an Internet connection device 22. In accordance with the invention, E-mail messages and attachments can be sent to the printer 10 for printing by a personal computer 24 attached to the LAN 18 or by a personal computer 26 with an Internet connection using an E-mail client to connect with the Internet 20. Alternately, the mail server 12 may be connected to the Internet 20 instead of to the LAN 18, for printing messages from the personal computers 26 connected to the Internet 20, or the mail server 12 may be connected only to the LAN 18 for printing messages only from other devices, such as personal computer 24, attached to the LAN 18.

Figure 2:
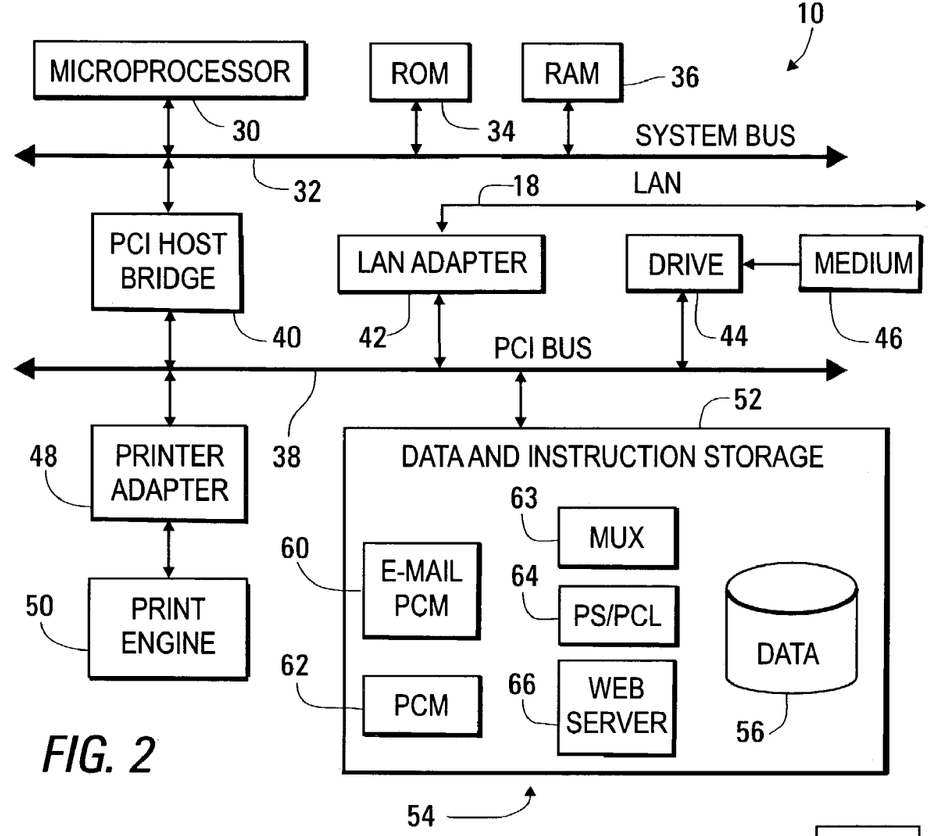
FIG. 2 is block diagram of the printer of FIG. 1.

FIG. 2 is a block diagram of the printer 10, which includes a microprocessor 30 connected by a system bus 32 to a ROM 34 (read only memory) and a RAM 36 (random access memory). The microprocessor 30 is also connected to a PCI (Peripheral Component Interconnect) bus 38 through a PCI host bridge 40. Various peripheral elements are connected to the PCI bus 38 to exchange signals representing data. For example, the LAN 18 is connected to the PCI bus 38 through a LAN adapter circuit 42. The printer 10 may optionally include a drive 44, also connected to the PCI bus 38, to read recorded signals representing data and program instructions from a removable storage medium 46, such as a diskette or a compact disk. A printer adapter 48, also connected to the PCI bus-38, drives a print engine 50 to produce the actual markings of the printing process on documents. These markings are produced, for example, by a process of exposing an electrically charged photoconductive drum to a pattern of light from a laser driven according to electrical signals, by developing the drum with a toner, and by transferring the toner from the drum to a sheet of paper. The printer 10 additionally includes data and instruction storage 52 which stores instructions for a number of programs or subroutines 54 for execution within the microprocessor 30, and which stores data read during the execution of the subroutines 54. The data and instruction storage 52 includes, for example, a hard disk drive providing non-volatile magnetic storage. Typically, such instructions and data are read from the data and instruction storage 52 into RAM 36 for execution of the instructions within the microprocessor 30.

In accordance with a preferred version of the invention, program instructions for operating the printer 10 in accordance with the invention are recorded on one or more hard file disks within data and instruction storage 52 during manufacture of the printer 10. Additionally, in accordance with a preferred version of the invention, data to set administrative values for configuration settings is received in the form of a modulated carrier wave through the LAN adapter 18 for storage within data and instruction storage 52. It is further understood that program instructions may be transmitted in the form of signals within a modulated carrier wave for recording on a computer readable medium. Furthermore, if the printer 10 includes the optional drive 44 to read a removable storage medium 46, data and instructions in the form of optically or magnetically recorded signals may be read from the storage medium 46 within the drive 44 for execution of the instructions within the microprocessor 30 or for storage within data and instruction storage 52. A removable medium 46, one or more magnetic disks within data and instruction storage 52, and a compact flash memory that may be used in place of a hard file within data and instruction storage 52 are all understood to be examples of computer readable media.

The stored programs and subroutines 54 include an E-mail PCM (printer control module) subroutine 60, which is executed within the microprocessor 30 in accordance with the invention to print at least a portion of an E-mail message received from the POP3 server 14 through the LAN 18. The stored programs and subroutines 54 further include one or more additional PCM subroutines 62 for printing documents from other sources (not shown) and a MUX (multiplexor) subroutine 63 for determining which of the PCM subroutines 60, 62 is used to control the print engine 50. For operation of the print engine 50, the data and instruction storage 52 must additionally store one or more PCL (printer control language) subroutines, with PostScript subroutine 64 preferably being used to print E-mail messages.

In accordance with a preferred version of the invention, the microprocessor 30 also executes a web server subroutine 66 stored in data and instruction storage 52. The web server subroutine 66 provides a user with a home page describing data needed to use the printer 10 for printing E-mail, such as the E-mail address to be used for this purpose. Additionally, following a request for a configuration-setting web page, together with an input providing a correct password for identifying the printer administrator as the individual having the authority of make configurational changes, the web server subroutine 66 provides web pages that can be used to change the configuration of the printer 10.

Figure 3:
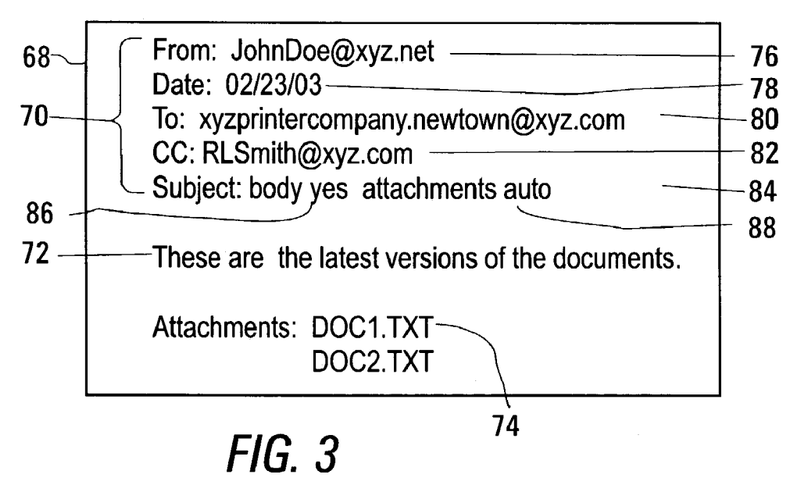
FIG. 3 is a pictographic view of an E-mail message transmitted to the printer within the system of FIG. 1.

FIG. 3 is a pictographic view of an E-mail message 68 transmitted to the printer 10. Like all other e-mail messages, this message 68 has certain components necessary for transmission through a network between a sender and a receiver, being composed of an E-mail header 70 and a body 72. One or more attachments may also be included, with the file names of the attachments being indicated on attachment lines 74. The E-mail header 70 includes a "from" address line 76, a date line 78, a "to" address line 80, a "CC" line 82, and a subject line 84.

To provide for operation of the printer 10 in accordance with the invention, the subject line 84 includes a first keyword-value pair 86 and a second keyword-value pair 88. The first keyword-value pair 86 controls, under certain conditions, whether the body 72 of the E-mail message 68 is printed, with the keyword in this pair always being "body," and with the value in this pair being either "yes" or "no."

Figure 4:
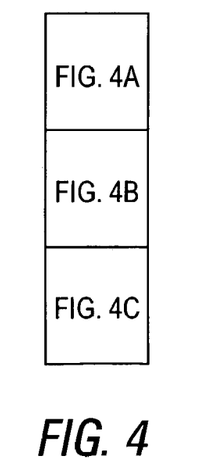
FIG. 4 is a flow chart showing process steps occurring within the printer of FIG. 2 in accordance with the invention, with FIG. 4 including FIG. 4A as an upper portion, FIG. 4B as a central portion, and FIG. 4C as a lower portion.

The second keyword-value pair 88 specifies conditions under which the attachments having file names given in lines 74 are printed, in a manner to be described in detail in reference to FIG. 4. Within the second keyword-value pair 88, the keyword is always "attach," and the value is either "auto," "none," or "all."

Figure 4A:
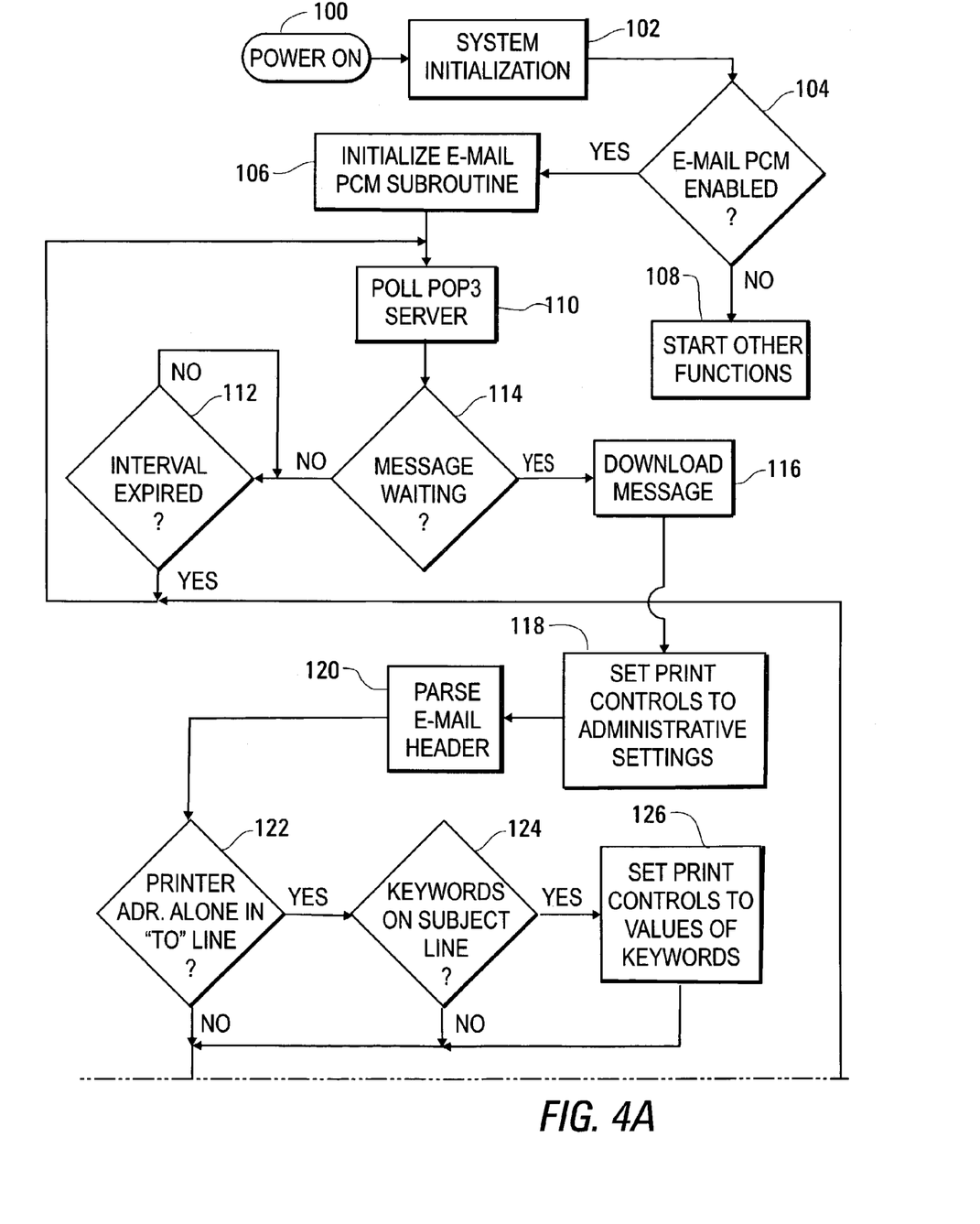
Figure 4B:
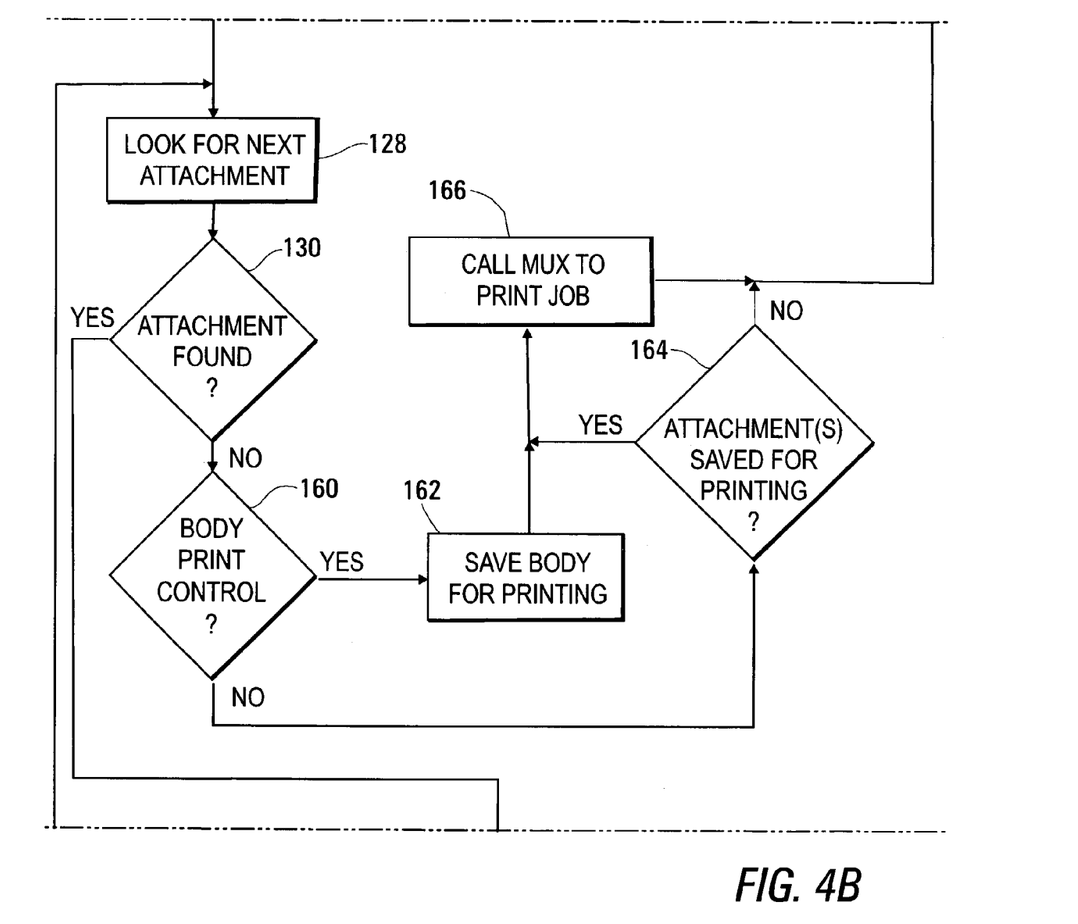
Figure 4C:
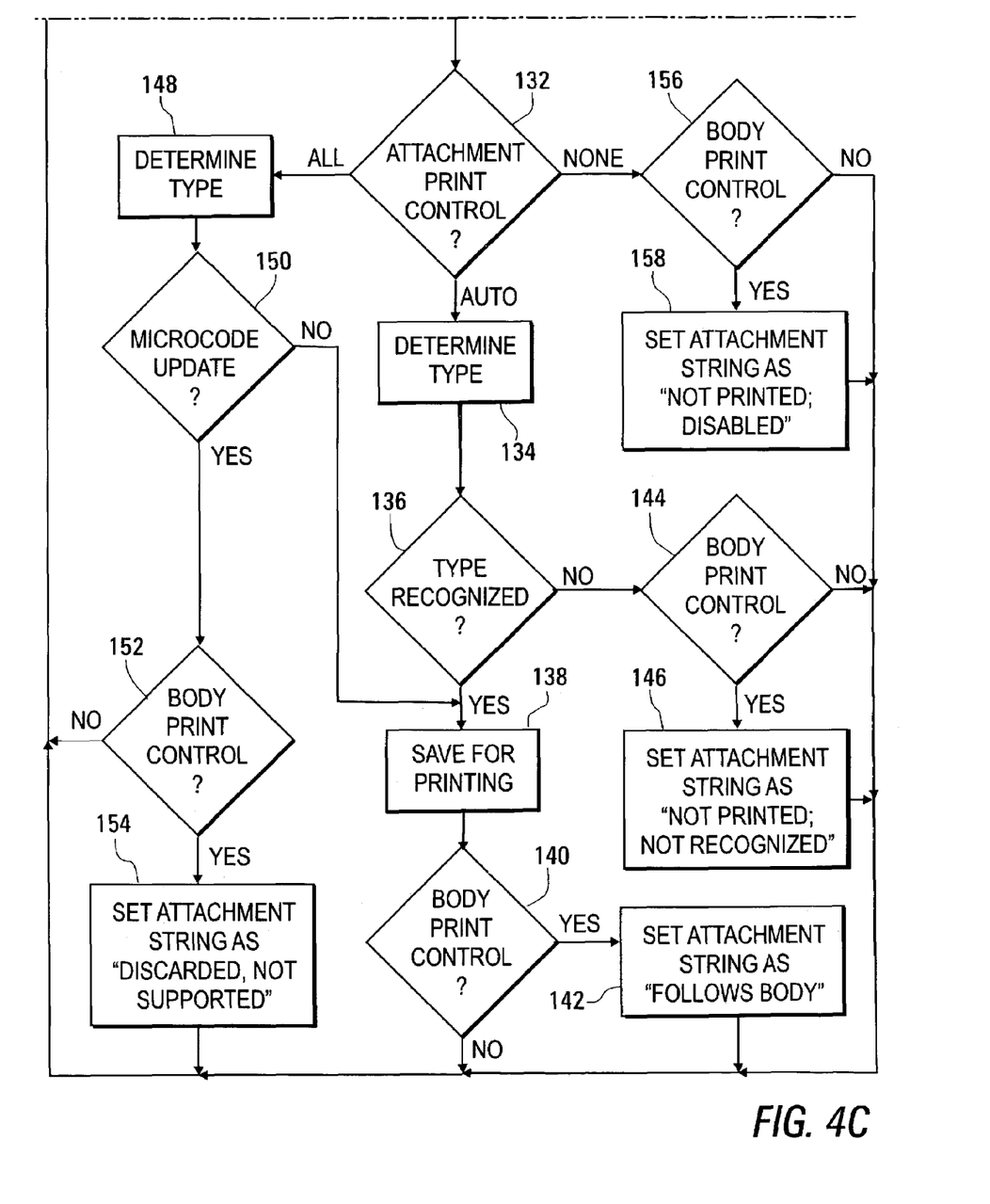

FIG. 4 is a flow chart showing process steps occurring within the printer 10 in accordance with the invention. FIG. 4 includes an upper section, labeled as FIG. 4A, a central section, labeled as FIG. 4B, and a lower section, labeled as FIG. 4C. After the printer 10 is turned on in step 100, a system initialization process occurs in step 102. Upon completion of this initialization process, a determination is made in step 104 of whether the E-mail PCM is enabled. For example, in step 104, the system checks the system configuration to determine if a hard disk drive is provided for data and instruction storage 52, as required for E-Mail printing, and additionally to see if the printer control language subroutine, such as the PS/PCL subroutine 64, required for E-mail printing, has been installed.

The data 55 in data and instruction storage 52 includes a number of configuration parameters that are stored during operation of the web server subroutine 66 to configure the printer 10. In step 104, the system also checks to determine that a PCM enabling configuration parameter has been set by the printer administrator during previous operation of the web server. If it is determined in step 104 that the E-Mail PCM is enabled, the E-Mail PCM subroutine 60 is enabled in step 106; otherwise the system proceeds to step 108 to start other functions.

During the process of initializing the E-Mail PCM subroutine 60 in step 106, this subroutine 60 is registered with a configuration manager function responding to changes made through the web server subroutine 66 by the printer administrator, so that a change in the value of certain configuration parameters is reported to the E-Mail PCM subroutine 60. Such configuration parameters include the PCM enabling configuration parameter and a polling interval configuration parameter determining the rate at which the POP3 server 14 is polled. Additionally, during the initialization of the E-mail subroutine 60 in step 106, this subroutine 60 is registered with the MUX subroutine 63.

After the initialization process of step 106 is completed, the E-mail PCM subroutine 60 runs on the processor 30 as a task in a multitasking environment. First, in step 110, the POP3 server 14 is polled to determine if there are any E-mail messages to be printed waiting in the central message store 16. After this first instance of polling the POP3 server 14, the system repetitively polls the POP3 server every time a polling interval has expired as determined in step 112. The duration of this interval is determined by the value of the polling interval configuration parameter.

If one or more messages is waiting, as determined in step 114, the first of these messages is downloaded in step 116. After this message is downloaded, the system proceeds to handle it as an E-mail printing job. An E-mail printing job comprises data representing the E-mail header 70, body 72, and any attachments indicated in lines 74 of a particular E-mail message. Thus, an E-mail printing job can be a multi-document job. If an E-mail printing job is found, the E-mail header 70 of the E-mail message is parsed to determine the manner in which the documents in the job are to be printed.

In order for the printer 10 to have received the E-mail print job, its address must have been in either the "To" line 80 or the "CC" line 82 of the E-mail header 70. If the address of the printer 10 is alone in the "To" line 80, control of the printing of the E-mail printing job is given to the person who submitting the E-mail message through his use of keyword-value pairs in the subject line 84 of the E-mail header 70. On the other hand, if the address of the printer 10 is only one of two or more addresses in "To" lines 80, or if the printer address is in a "CC" line 82 instead of in the "To" line 80, control of the E-mail printing job is given to the administrative settings of the printer 10. These settings are provided, for example as configuration parameters stored within data storage 56 in response to actions of the printer administrator during previous execution of the web server subroutine 66. Both the administrative settings and the keyword-value pairs have the same possible values, with the settings for controlling the printing of the E-mail body being either "yes" or "no," and with the settings for controlling the printing of attachments being either "auto," "all," or "none." If these keyword-value pairs cannot be found in the subject line, the stored administrative values are used.

Thus, in step 118, the print controls, which determine how the E-mail body and attachments are to be printed, are set to administrative values according to the administrative settings stored in data storage 56. Then, in step 120, the E-mail header 70 is parsed. Then, in step 122, a determination is made of whether address of the printer 10 is alone in the "To" line 80. If it is, a determination is made in step 124 of whether the keyword-value pairs are present in the subject line of the header 70. If it is, the print controls for this print job are set in step 126 in accordance with the keyword-value pairs 86, 88 in the subject line 84. Otherwise, i.e. if the printer address is not alone in the "To? line or if the keyword-value pairs are not present in the subject line, these print controls remain as set in step 118 in accordance with administrative settings stored in data storage 56.

After setting the controls for the particular E-mail print job in step 118 or in step 126, the system proceeds to step 128, in which a process of preparing each attachment for printing is begun with looking for a next attachment. If no attachment has yet been processed, the next attachment is the first attachment. If an attachment is found, as determined in step 130, the system proceeds to step 132, in which the value of the attachment print control for this E-mail print job is determined. If the value of this control is "auto" the system proceeds to step 134, in which the type of the document is determined.

In accordance with Internet standards, attachments that are not in plain (ASCII) text are transmitted with MIME (Multipurpose Internet Mail Extensions) headers that identify the type of file. For example, a file may be identified as an html text file. Thus, in step 134, the MIME entry of the attachment is parsed to determine the type of the attachment, with a portion of the content of the attachment additionally being parsed to determine if it is a printable attachment.

In general, the printer 10 has the capability of printing (in the usual sense of producing a readable copy) only certain types of documents. For example, the printer 10 is able to print documents in plain text, PostScript, PCL, or PDF formats, which are considered to be "recognized" by the printer 10. Documents in other file formats may be printed as unreadable, or "garbage" documents. Therefore, in step 136, a determination is made of whether the document type determined in step 134 is of a recognized type. If it is, the attachment is saved in step 138 for printing. Then, in step 140, a determination is made of whether the body 72 of the E-Mail message is to be printed. If it is, as indicated by the body print control having a value of "yes," the attachment line 74, providing the file name of the attachment, is replaced in step 142 by a character string "attachment follows body," followed by the file name. If the body 72 is not to be printed, as indicated by the body print control having a value of "no," this replacement is not made.

If it is determined in step 136 that the attachment is not of a recognized type, the value of the body print control is examined in step 144. If this value is "yes," indicating that the body 72 is to be printed, the attachment line 74, providing the file name of the attachment, is replaced in step 146 by a character string "attachment not printed, not recognized," followed by the file name. If this value is "no," indicating that the attachment is not to be printed, this replacement is not made.

If it is determined in step 132 that the attachment print control value is "all," an attempt is made to print all attachments except for microcode update files. This means that unrecognized file types will be printed and may appear as "garbage" in the form of unreadable strings of characters. Thus, the system proceeds to step 148, in which the MIME header and content of the attachment are examined to determine its type. If it is then determined in step 150 that the attachment is not a microcode update, the system proceeds to step 138, in which the attachment is saved for printing, and from which the attachment line 74 identifying the attachment is replaced if the body 72 is to be printed, as described above.

On the other hand, if it is determined in step 150 that the attachment is a microcode update, a determination is made in step 152 of whether the document is to be printed, as indicated by a value of "yes" for the body print control. If the body is to be printed, the attachment line 74 identifying the attachment is replaced in step 154 by a character string indicating "attachment discarded, microcode update not supported," followed by the file name. If the body is not to be printed, this replacement is not made.

If it is determined in step 132 that the attachment print control value is "none," no attachments are to be printed, and the value of the print control is examined in step 156. If this value is "yes," the attachment line 74 identifying the attachment is replaced in step 158 by a character string indicating "attachment not printed, disabled," followed by the file name. If the body is not to be printed, this replacement is not made.

After an attachment is processed as described above, the system returns to step 128 to look for another attachment. If a next attachment is found, as determined in step 130, the system proceeds to step 132 to begin processing the next attachment. If a next attachment is not found, it is understood that this processing of attachments is completed, so it is determined in step 160 whether the body is to be printed. If it is, as indicated by the body print control having a value of "yes," the body is saved for printing before any of the attachments in step 162. If the body is not to be printed, a determination is made in step 164 of whether any of the attachments have been saved for printing. If at least one of the attachments has been saved for printing, or if the body has been saved for printing, the MUX subroutine 63 is called in step 166 to print the E-mail print job. Otherwise, it is known that there are no documents to print. In either case, the system then returns to step 110 to determine if another E-mail message is waiting at the POP3 server. If it is, as determined in step 114, this next message is processed as described above. If no message is waiting, the system proceeds to step 112 to wait for the expiration of the polling interval.

For example, the process of saving individual documents for printing may mean encoding data in a form understood by the printer and saving the data in a particular group of files or simply arranging a pointer to point to the beginning of a file. After being called to print the job in step 166, the MUX subroutine 63 can start the printing process immediately, or it can place the print job in a queue awaiting availability of the print engine 50. If the body has been saved for printing, it is printed before any of the attachments, and the attachments, if they are printed, are printed in the order in which they appear in the attachment lines 74 of the E-mail message 68.

According to a preferred version of the invention, the printer 10 acts as a web server to provide web pages in response to a request from a client computer system 24, 26. These web pages include information describing use of the printer 10. If the printer 10 is enabled to print E-mail messages, its address for receiving such messages is displayed in this information. The web pages served by the printer 10 include a number of hyperlinks that the user may select to get additional information. In response to the selection of certain of these hyperlinks, the printer 10 causes a dialog box to be displayed asking for a password. If the password of a printer administrator is then properly provided as an input by the user, data is presented in response to these hyperlinks, with the user further being allowed to change configuration settings, with new configuration parameters being recorded in data storage 56.

Figure 5:
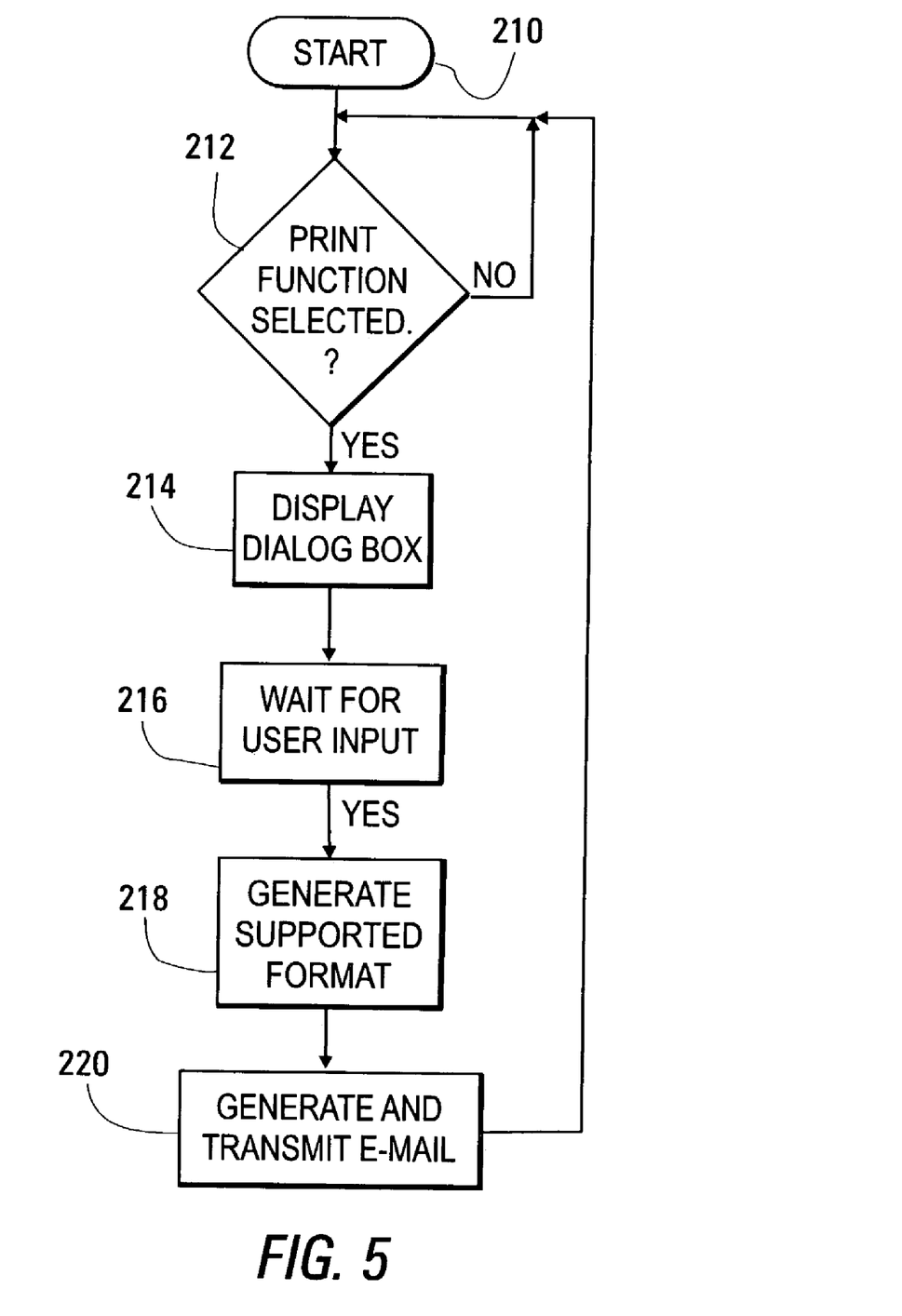
FIG. 5 is a flow chart showing process steps occurring within a computer within the system of FIG. 1 to generate an E-mail message for printing in accordance with an alternative embodiment of the invention.

FIG. 5 is a flow chart showing process steps occurring within a computer system 24, 26 in accordance with an alternative embodiment of the invention to generate E-mail messages for printing within the printer 10. These process steps begin in step 210 in response to choosing the E-mail printer as the system printer. This is done, for example, by clicking an icon within an application program or by choosing the E-mail printer from a list of printers presented by the operating system. After the E-Mail printer is selected as the system printer, the system waits in step 212 for the print function to be selected by a conventional process, such as clicking a icon or a menu selection in an application program used to prepare a document to be printed or by dragging an icon representing a document to be printed to an icon representing the printer on a screen displayed by the operating system. Alternately, this process may be accomplished in a single step, with the action of selecting the print function also being used to determine which of several printers, including the E-mail printer, will be used to print the document.

In either case, when the print function is selected in step 212, a dialog box is displayed on the computer display in step 214. For example, the dialog box may allow the user to select which of several E-mail printers is to be used to print the document, or, if the system has been configured for use as the user wishes, he may simply click a button in the dialog box indicating "OK" to proceed The system waits in step 216 for this input. The printer driver within the computer 24, 26 then generates, in step 218, a file of the document in a format supported by the printer 10. For example, the printer 10 accepts and prints documents in the PostScript, PCL, or PDF formats. Then, in step 220, the port monitor generates an E-mail header to be transmitted as an E-mail message to the printer with the document.

Referring additionally to FIG. 3, the E-mail message generated by the port monitor includes the document file generated by the printer driver as an attachment, with no other attachments being included. Within the E-mail header 70 of this E-mail message, the "To" line 80 includes only the E-mail address of the printer 10. The "CC" line 82 is blank. The subject line 84 includes the keyword-value pair "body no" so that the body of the message is not printed, and either the keyword-value pair "attachment all" or "attachment auto" so that the attachment will be printed. The "attachment all" and "attachment auto" keyword-value pairs should have the same effect, since the attachment has been written by the printer driver in a file format supported by the printer.

As described above, the printer 10 operates in the same way to print documents generated by this alternate method as to print messages otherwise generated as E-mail messages and attachments without the use of the printer driver and port monitor. Alternately, the port monitor in the computer 24, 26 and the E-mail PCM 62 in the printer 10 may be modified to work together in a way providing one or more additional features. For example, the port monitor may be modified to encrypt the E-mail message so that it can only be decrypted within the printer 10.

While the syntax of keyword-value pairs has been used to describe elements within the subject line of an E-mail message used to control the printing process, it is understood that the keywords and values, are both understood to be keywords in themselves, since they are recognized as having particular meanings in the subsequent processing, and that single keywords, such as "bodyyes," "bodyno," "attachall," "attachauto," "attachnone" may be alternately used for the pairs of words described in detail above.

While the invention has been described with some degree of particularity, it is understood that this description has been given only by way of example, and that many changes can be made without departing from the spirit and scope of the invention.

What is claimed is:

1. A system for remotely printing a document, wherein said system comprises: a network; a mail server connected to said network, wherein said mail server receives and stores E-mail messages from said network; a computer transmitting an E-mail message including said document to said mail server over said network; and a printer receiving said E-mail message from said mail server, wherein said printer includes a processor, data storage, and a print engine printing images on paper in response to operation of said processor, wherein said processor is programmed to execute steps of: parsing a header portion of said E-mail message to determine whether portions of said E-mail message are to be printed according to administrative settings derived from data stored within said data storage and to determine whether portions of said E-mail message are to be printed according to user settings determined from keywords within said header portion of said E-mail message, in response to determining that portions of said E-mail message are to be printed according to said administrative settings, causing said print engine to print said portions of said E-mail message according to said administrative settings, and in response to determining that portions of said E-mail message are to be printed according to said user settings, causing said print engine to print said portions of said E-mail message according to said user settings; wherein, said processor is programmed to determine that said portions of said E-mail messages are to be printed according to said user settings in response to a determination that an E-mail address of said printer is an only address in a "To" destination address within said header of said E-mail message, said processor is programmed to determine that said portions of said E-mail messages are to be printed according to said administrative settings in response to a determination that said E-mail address of said printer is one of a plurality of addresses in said "To" destination address within said header of said E-mail message, and said processor is programmed to determine that said portions of said E-mail messages are to be printed according to said administrative settings in response to a determination that said E-mail address of said printer is in a "CC" destination address line within said header of said E-mail message instead of in said "To" destination address within said header of said E-mail message.

2. The system of claim 1, wherein said user settings and said administrative settings each include:
a first printing control determining whether a body of said E-mail message is to be printed, and
a second printing control determining whether an attachment of said E-mail message is to be printed only if said attachment is written in a file format recognized by said printer, whether said attachment of said E-mail message is to be printed regardless of whether said attachment is written in a file format recognized by said printer, or whether said attachment is not to be printed.

3. The system of claim 2, wherein said first and second printing controls of said user settings are derived from keywords in a subject line within said header of said E-mail message.

4. The system of claim 1, wherein
said printer is connected to said network to transmit and receive data, and said processor is additionally programmed to:
receive a password transmitted over said network, determine that said password is correct, and store data for deriving said administrative settings in response to data received from said network.

5. The system of claim 4, wherein said administrative settings include data determining whether portions of said E-mail message are printed.

6. The system of claim 4, wherein
said printer polls said mail server on a periodic basis to determine if an E-mail message for said printer is stored within said mail server,
said printer receives said E-mail message for said printer upon determining that said E-mail message for said printer is stored within said mail server, and
said administrative settings additionally include data setting a time interval determining said periodic basis.

7. The system of claim 1, wherein said user settings are derived from keywords in a subject line within said header of said E-mail message.

8. The system of claim 1, wherein
said printer is connected to said mail server over said network,
said printer polls said mail server on a periodic basis to determine if an E-mail message for said printer is stored within said mail server, and
said printer receives said E-mail message for said printer upon determining that said E-mail message for said printer is stored within said mail server.

9. The system of claim 1, wherein
said computer generates said E-mail message in response to a user selection to print said document by E-mail,
said document is included as an attachment, written in a file format recognized as printable by said printer, and
said E-mail message is generated to include a header addressed to said printer and a textual data causing said attachment to be printed by said printer.

10. A method for remotely printing a document, wherein said method comprises: a) receiving within a printer connected to a network an E-mail message including said document addressed to said printer; b) parsing a header portion of said E-mail message to determine whether portions of said E-mail message are to be printed according to administrative settings derived from data stored within said data storage and to determine whether portions of said E-mail message are to be printed according to user settings determined from keywords within said header portion of said E-mail message, determining whether an address of said printer is an only address within a "To" destination address line of said E-mail message; in response to determining that said address of said printer is an only address within said "To" destination address line of said E-mail message, determining that said portions of said E-mail message are to be printed according to said user settings, and in response to determining that said address of said printer is not an only address within said "To" destination address line of said E-mail message, determining that said portions of said E-mail message are to be printed according to said administrative settings, c) in response to determining that portions of said E-mail message are to be printed according to said administrative settings, causing said print engine to print said portions of said E-mail message according to said administrative settings, and d) in response to determining that portions of said E-mail message are to be printed according to said user settings, causing said print engine to print said portions of said E-mail message according to said user settings.

11. The method of claim 10, wherein said user settings and said administrative settings each include:
a first printing control determining whether a body of said E-mail message is to be printed, and
a second printing control determining whether an attachment of said E-mail message is to be printed only if said attachment is written in a file format recognized by said printer, whether said attachment of said E-mail message is to be printed regardless of whether said attachment is written in a file format recognized by said printer, or whether said attachment is not to be printed.

12. The method of claim 11, wherein said first and second printing controls of said user settings are derived from key words in a subject line within said header of said E-mail message.

13. The method of claim 10, wherein step a) is preceded by:
receiving said E-mail message in a mail server connected to said network; and
transmitting said E-mail message to said printer from said mail server.

14. The method of claim 13, wherein said E-mail message is transmitted to said printer from said mail server in response to said printer periodically polling said mail server to determine if an E-mail message is stored in said mail server.

15. The method of claim 13, wherein said administrative settings include data determining whether portions of said E-mail message are printed.

16. The method of claim 10, additionally comprising:
polling said mail server on a periodic basis from said printer to determine if an E-mail message for said printer is stored within said mail server, wherein said administrative settings additionally include data setting a time interval determining said periodic basis; and receiving within said printer said E-mail message for said printer upon determining that said E-mail message for said printer is stored within said mail server.

17. The method of claim 10, additionally comprising:

generating said E-mail message within a computer system connected to said network in response to a user selection to print said document by E-mail, wherein said E-mail message is generated to include a header addressed to said printer and a textual data causing said attachment to be printed by said printer; and placing said document as an attachment to said E-mail message, written in a file format recognized as printable by said printer.

18. A computer readable medium having recorded thereon computer executable instructions for performing a method for remotely printing a document, wherein said method comprises: a) receiving within a printer connected to a network an E-mail message including said document addressed to said printer; b) parsing a header portion of said E-mail message to determine whether portions of said E-mail message are to be printed according to administrative settings derived from data stored within said data storage and to determine whether portions of said E-mail message are to be printed according to user settings determined from keywords within said header portion of said E-mail message, determining whether an address of said printer is an only address within a "To" destination address line of said E-mail message: in response to determining that said address of said printer is an only address within said "To" destination address line of said E-mail message, determining that said portions of said E-mail message are to be printed according to said user settings, and in response to determining that said address of said printer is not an only address within said "To" destination address line of said E-mail message, determining that said portions of said E-mail message are to be printed according to said administrative settings, c) in response to determining that portions of said E-mail message are to be printed according to said administrative settings, causing said print engine to print said portions of said E-mail message according to said administrative settings, and d) in response to determining that portions of said E-mail message are to be printed according to said user settings, causing said print engine to print said portions of said E-mail message according to said user settings.

19. The computer readable medium of claim 18, wherein said user settings and said administrate settings each include:

a first printing control determining whether a body of said E-mail message is to be printed, and a second printing control determining whether an attachment of said E-mail message is to be printed only if said attachment is written in a file format recognized by said printer, whether said attachment of said E-mail message is to be printed regardless of whether said attachment is written in a file format recognized by said printer, or whether said attachment is not to be printed.

20. The computer readable medium of claim 19, wherein said first and second printing controls of said user settings are derived from key words in a subject line within said header of said E-mail message.

21. The computer readable medium of claim 18, wherein step a) is preceded by polling a mail server on a periodic basis to determine if an E-mail message is stored therein.

22. The computer readable medium of claim 19, wherein said administrative settings include data determining whether portions of said E-mail message are printed.

23. The computer readable medium of claim 18, additionally comprising:

polling said mail server on a periodic basis from said printer to determine if an E-mail message for said printer is stored within said mail server, wherein said administrative settings additionally include data setting a time interval determining said periodic basis; and receiving within said printer said E-mail message for said printer upon determining that said E-mail message for said printer is stored within said mail server.

* * * * *